United States Patent [19]  
Mann

[11] 3,780,538  
[45] Dec. 25, 1973

[54] CABLE REELING DRUMS
[75] Inventor: John Brien Mann, Calverton, England
[73] Assignee: Metropolitan Tool and Products Limited, Nottingham, England
[22] Filed: Sept. 14, 1972
[21] Appl. No.: 288,981

[30] Foreign Application Priority Data
Sept. 17, 1971 Great Britain.................... 43567/71

[52] U.S. Cl..................... 64/30 C, 64/19, 192/48.3, 192/70.18, 192/111 B
[51] Int. Cl............................................. F16l 7/02
[58] Field of Search.................... 64/30 C, 30 R, 19; 192/111 B, 48.3, 70.18

[56] References Cited
UNITED STATES PATENTS
1,887,355  11/1932  Kranick............................... 64/30 R
2,306,730  12/1942  Holmes................................ 64/30 C
2,771,977  11/1956  Uher................................ 192/111 B
2,864,481  12/1958  Strecker.......................... 192/111 B
3,105,371  10/1963  Forrest............................... 64/30 C

FOREIGN PATENTS OR APPLICATIONS
549,308  10/1956  Italy................................ 192/70.18

Primary Examiner—Manuel A. Antonakas  
Assistant Examiner—Randall Heald  
Attorney—E. F. Wenderoth et al.

[57] ABSTRACT

A cable reeling drum for reeling in the cable of a movable machine, such as an electrically driven crane, is driven by a motor through a slipping clutch which is designed to operate continuously over long periods without large scale variation of the transmitted torque. To this end the slipping clutch includes a pair of floating clutch plates, which are axially pressed against a clutch disc member. The clutch plates are driven by means of a spider secured to the clutch input shaft. The spider is connected to one or both clutch plates by means of two or more links which are connected to the spider and the clutch plate so as to permit free axial movement of the clutch plate. Ball joint connections between the links and the spider and clutch plate are provided for that purpose. The clutch disc is preferably channel-shaped to provide improved cooling and the clutch plates and disc are enclosed within a casing forming the output member of the clutch, the casing protecting these parts from dirt and water.

9 Claims, 7 Drawing Figures

CABLE REELING DRUMS

This invention relates to cable reeling drums, especially those of the type on which electrical cable or flexible pipes or hoses may be wound.

Where machines which travel along a track, such as a crane or a gantry, require to be supplied with electric power from a fixed outlet, a variable length of cable is needed to extend between the machine and the outlet. It is convenient to have a cable reeling drum to pay out and reel in cable when the machine moves so as to avoid kinking the cable without applying undue tension. The drum may be stationary but is preferably mounted on the machine.

It has been proposed previously to utilise a motor-driven cable reeling drum in which a slipping clutch is arranged in the drive between the motor and the cable drum. The motor is driven in such a direction that the drum will wind in slack cable and keep the cable under tension when the machine is stationary.

In one known arrangement the motor drives the cable drum through a worm and worm wheel, the worm wheel driving a clutch connected to the cable drum. The worm wheel and friction discs of the clutch run in an oil bath. It has been found that with this arrangement the dissipation of heat from the worm and wheel drive and the slipping clutch is unsatisfactory because of its enclosure in the casing containing the oil bath. It is an object of the present invention to provide an apparatus of this kind in which better arrangements are provided for dissipation of heat from the slipping clutch.

Accordingly the present invention provides a drive arrangement for a cable reeling drum comprising a drive shaft, a support member rotatably mounted on the drive shaft but axially fixed in relation thereto, an annular disc member secured to said support member, a drive member connected to the drive shaft, a first clutch plate member coaxial with the drive shaft and axially floating in relation thereto, at least two links drivingly connecting said first clutch plate member to said drive member, said links being so connected that some axial movement of said first clutch plate member relative to said drive member is allowed, a second clutch plate member coaxial with said drive shaft and axially floating in relation thereto, axially spaced from said first clutch plate member and on the opposite side of said disc member, means connecting said second clutch plate member for rotation with the drive shaft so that axial movement of the second clutch plate member is allowed relative to said first clutch plate member and said disc shaft, and means for applying an axial closing pressure between the first and second clutch plate members so that the clutch plate members press against the opposite sides of the disc member and provide a frictional drive between said drive shaft and said support member, one of said drive shaft and said support member being connected for drive from a motor and the other of said drive shaft and said support member being drivingly connected to a cable reeling drum.

In order that excessive loads are not imposed on a cable when cable reeling is started it is desirable that the static frictional forces in the clutch should not be substantially greater than the dynamic friction forces. It is also desirable that the arrangement is capable of supplying a constant level of torque during long periods of operation. The present invention seeks to achieve satisfactory results in these respects by the provision of an arrangement which is intended to ensure adequate and even cooling of the friction surfaces, and by providing for axial movement of the clutch plates whilst under drive.

The annular disc member is preferably of generally channel-shape in transverse section, with the friction pads of the clutch plates engaging opposite outer surfaces of the member. The heat thus generated is dissipated to air flowing within the member as it rotates. Vanes may be provided on the inner surfaces of disc member so that air flow is increased.

The connection between the disc member and the first clutch plate by links is of importance since the clutch plate is free to move axially even under load. By allowing for such axial movement wear of the pads during prolonged operation will not lead to excessive reduction of transmitted torque. Preferably the means connecting the second clutch plate for rotation with the drive shaft is also constituted by at least two links for the same reasons.

The support member may be a framework having connecting radial spokes but is preferably an enclosed casing surrounding the drive member and clutch plates. In this way protection against water and grit and corrosion of the disc member is provided.

A preferred arrangement of the drive includes an annular pressure plate rotatable with said drive shaft and coaxial with said clutch plates, means for restraining in at least one direction axial movement of said pressure plate relative to one clutch plate, and resilient means arranged between the pressure plate and the other clutch plate, whereby said axial closing pressure is applied to the clutch plates. The means for restraining axial movement may include an axially adjustable connection so that the loading applied by the resilient means to the other clutch plate is adjustable. This axially adjustable connection may include interengaged screw-threaded parts. Where a casing contains the drive arrangement this may conveniently form at least part of the hub of the cable reeling drum.

The invention will now be further described, by way of example only, with reference to the accompanying drawings, in which.

Figure 1:
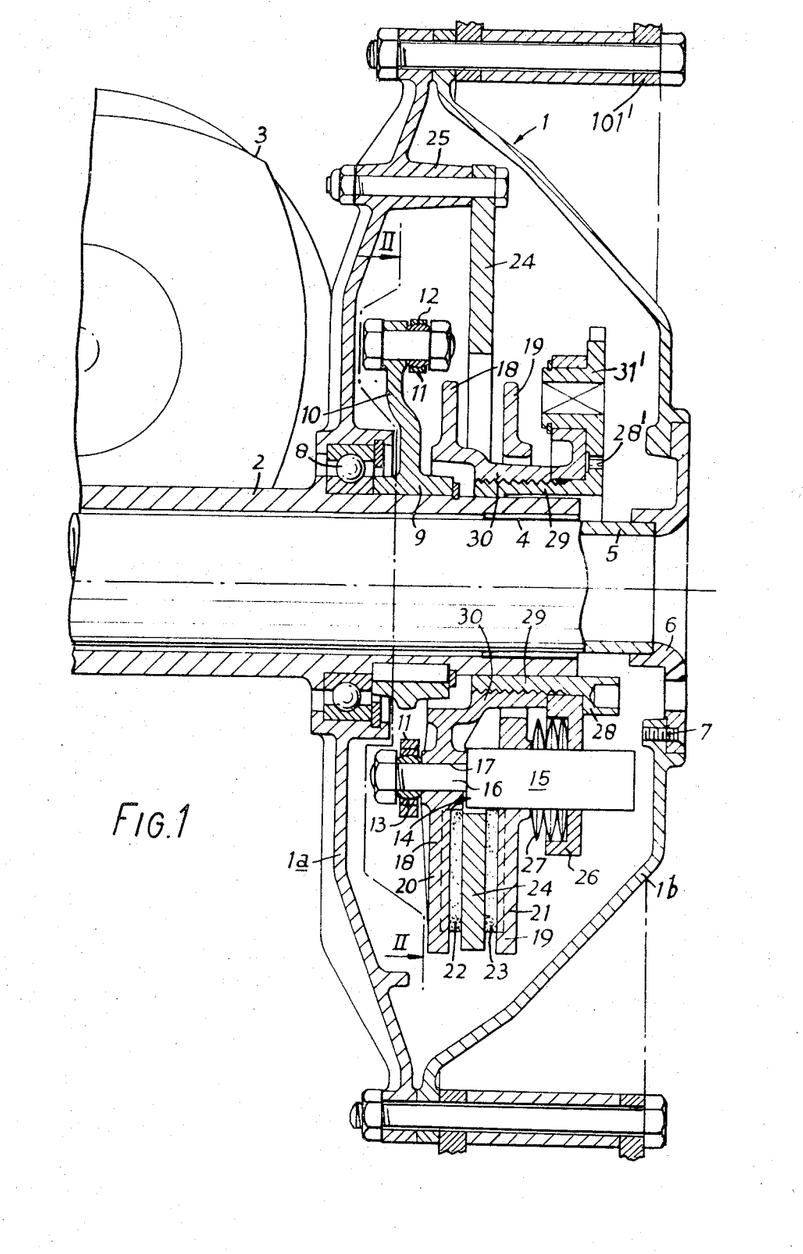
FIG. 1 is a transverse sectional view of the hub of a cable reeling drum.
Figure 2:
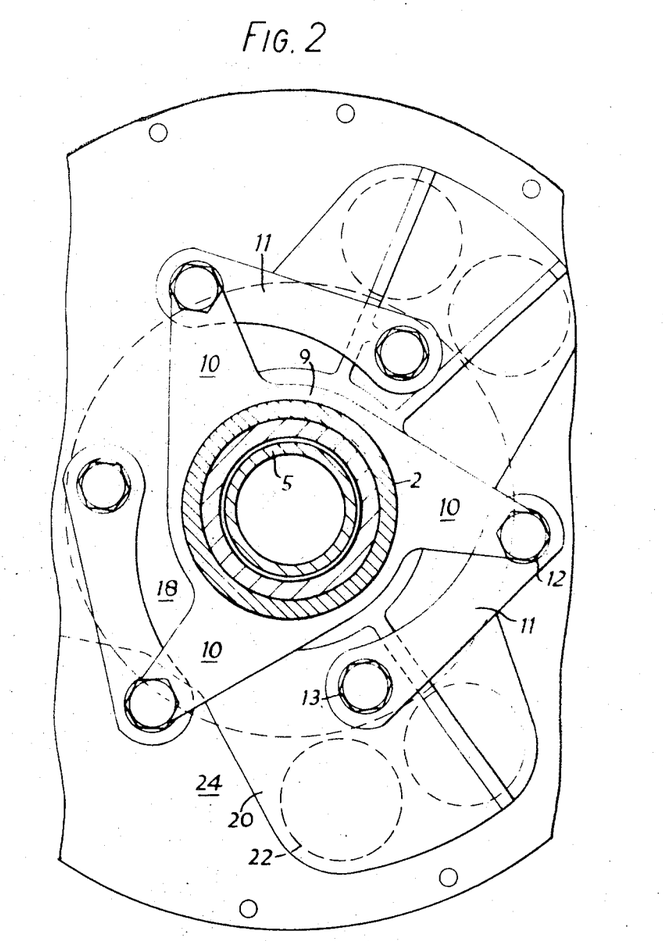
FIG. 2 is a part-sectional, part plan view on the line II—II of FIG. 1.

FIGS. 1 and 2 show the hub arrangement of a cable reeling drum. An enclosed hub casing 1 having two parts 1a, 1b, bolted together, is rotatably mounted on a drive shaft 2 which carries a worm wheel (not shown) driven by a worm supported by a motor generally indicated at 3. The cable reeling drum itself is indicated at 101'. The drive shaft 2 is hollow and supports the hub casing 1 by bearing 8 and by bearing 4 arranged between the outer end of the shaft 2 and an inner hollow coaxial shaft 5. The shaft 5 extends beyond the end of the drive shaft 2 and has an annular flange 6 welded to its outer end and this flange is connected to the casing part 1b by screws 7. Bearing 8 is arranged between the outer surface of the shaft 2 and the casing part 1a and holds the casing against axial movement on the shaft 2.

A spider drive member 9 is keyed to the drive shaft 2 within the casing 1 and has three outwardly-extending arms 10. Each arm 10 carries a link 11 connected to the arm at one of its ends by a ball joint 12. Each of the three links 11 is connected at its other end by a ball joint 13 to one end of a respective pin 14. The pins 14 normally lie roughly at right angles to the links 11 and have a larger diameter portion 15 and a smaller diameter portion 16. The portion 16 of each pin passes through a bore 17 in a first clutch plate 18 and the pin is held against movement in plate 18 by the ball joint 13 and the shoulder between portions 15 and 16 so that the pin cannot move axially with respect to the plate.

A second clutch plate 19 is mounted on the major portions 15 of the pins 14 so that it can slide axially on the pins. The clutch plates 18, 19 are formed with opposing lobes or extensions 20, 21 respectively on each of which are mounted friction pads 22, 23 respectively. There are three lobes on each plate and each lobe carries two circular friction pads. An annular disc 24 is arranged between the lobes 20, 21 with the friction pads 22 and 23 in contact with opposite sides of the disc. The disc 24 is bolted to the hub casing 1 through angularly-spaced bosses 25 formed in casing part 1a.

Pins 14 have a cap member 26 (equivalent to a pressure plate) slidably mounted on their major diameter portions 15 and the member 26 holds packs of spring washers 27, which surround the portions 15 and press the second clutch plate 19 against disc member 24. A generally annular pressure member 28 surrounding the drive shaft 2 presses the cap member 26 against its respective spring washers 27. The pressure member 28 has a sleeve section 29 which is externally screw-threaded and is engaged with a corresponding internally threaded section 30 forming part of the first clutch plate 18. It should be particularly noted that as a result of the connection of clutch plate 18 to spider drive member 9 by means of links 11 and ball joints 12 and 13, the assembly of clutch plates 18 and 19 is freely movable axially in relation to drive shaft 2 even under full load, so that substantially constant pressure may be maintained between friction pads 22 and disc 24 within the service life of the pads.

The pressure member 28 has an aperture 31 which may receive a tommy bar for rotating the member 28 relative to the clutch plate 18 so that the axial distance between the plate 19 and member 28 can be varied. Thus the pressure exerted by the friction pads 22, 23 on the disc 24 can be varied by adjusting the axial distance between the plates 19 and 28 so that the loading applied by the spring washers 27 is varied. Since both clutch plates 18 and 19 float with respect to the disc 24 they automatically centre on the disc so that substantially equal forces are exerted by the pads 22 and 23.

In an alternative arrangement, also illustrated in FIG. 1, the pressure member 28 is provided with a series of teeth 28' and is rotated by engagement with a pinion 31' which is rotatably mounted in an extension of the cap member 26. Access to the pinion 31' is gained by means of an aperture (not shown) in the casing member 1b.

In operation the drive shaft 2 is driven by the motor 3 in such a direction that the cable reel drum attached to the hub casing 1 tends to wind on cable. The spider 9 turns with the drive shaft and the links 11 transmit the drive to the pins 14 through ball joints 12 and 13. An adjustable proportion of the torque supplied by the motor is transmitted to the disc 24 (and hence to the cable drum through the casing 1) by friction between the pads 22, 23 and the disc. This frictional force is dependent on the loading imposed by the spring washers 27 which in turn is dependent on the axial distance between the plates 19 and member 28. It should however be noted that the spring washers are of the Belleville type and have the characteristic that over a limited range the loading which they impose does not vary very much with their spacing. Thus although the distance between cap member 26 and clutch plate 19 increases with wear of the pads 23 it is not necessary to make numerous adjustments to maintain the axial closing pressure between the plates. This contributes to the maintenance of substantially constant torque which the arrangement seeks to provide. In this arrangement the clutch plates run dry but it may be possible to employ an oil filled casing in some circumstances. The motor 3 drives the shaft 2 at a speed slightly in excess of that required for maximum speed of revolution of the cable reel necessary to wind in cable without leaving slack in the cable as it is reeled in.

One criterion for determining the loading on the washers 27 is that the maximum torque transmissable to the disc 24 is insufficient to cause damage to the cable, under stationary conditions, when kept under tension by running the motor and allowing the clutch plates 18 and 19 to slip with respect to the disc 24. When slack cable needs to be taken up by the cable drum the clutch still slips and the frictional drive forces on the disc 24 are substantially constant. When cable is being drawn out from the reel, the motor may be stopped so that the clutch acts as a brake. The construction is such that there is no excessive change in torque transmitted to the drum when the motor is started under these conditions. Accordingly, it is possible to switch off the motor when cable is being paid out by the cable drum or when the cable reel is at rest.

It is however possible to continue operation of the motor whilst the cable is being paid out since the present arrangement has improved heat dissipation properties. The heat is mainly dissipated from the disc 24 through the bosses 25 to the casing 1. In some circumstances it may be advisable to have a complete or interrupted annular flange on the casing 1 in line with the bosses 25 and in contact with the disc 24 to reduce resistance to heat flow across the joint.

Although the casing 1 preferably serves as the hub of the cable drum the drum may be in other positions, such as on the opposite side of the motor to the casing. An inner drive shaft (see shaft 5) may then transmit the drive to the cable drum.

Figure 3:
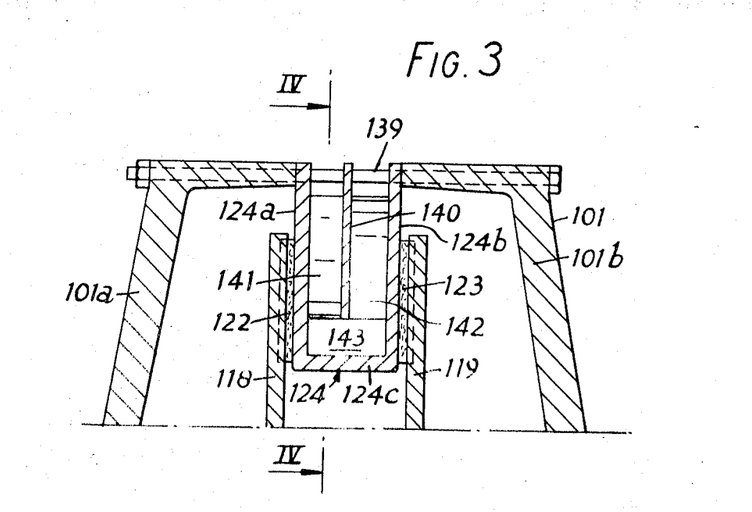
FIG. 3 is a sectional view of a detail modification of the hub of FIG. 1.
Figure 4:
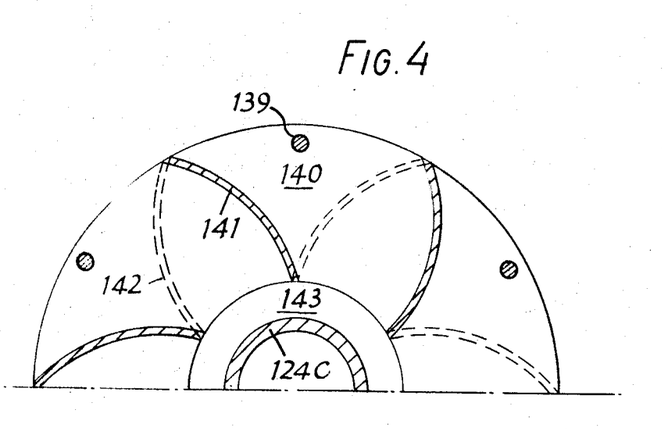
FIG. 4 is a sectional view on the line IV—IV of FIG. 3.

An alternative construction of the hub casing is shown in FIGS. 3 and 4. This construction takes advantage of the fact that heat dissipation is aided by rotation of the hub casing.

Referring to these figures, a disc member 124 is bolted between the two halves 101a, 101b of a cable drum hub casing 101 by bolts 139. The disc member 124 has two spaced discs 124a and 124b joined by a circular flange 124c. The discs 124a, 124b are in contact with friction pads 122, 123 which are mounted on clutch plates 118, 119 respectively which are spring loaded as before. The disc member also has a central partition 140 which lies parallel to and between the discs 124a and 124b. The partition 140 is joined to the discs 124a and 124b by vanes 141 and 142 respectively. The partition 140 and vanes 141, 142 extend to the outer edge of member 124 but leave an annular chamber 143 between their inner ends and the flanges 124c.

Thus the arrangement provides increased ventilation, and hence cooling of the disc member 124 since, as the hub casing 101 rotates, air circulation past the discs 124a and 124b is induced. In one direction of rotation air passes into the chamber 143 between the disc 124a and the partition 140 under the action of the vanes 141 and leaves between the partition and the disc 124b by action of the vanes 142. Moreover, since there are two complete annular areas of contact between the casing 101 and the discs 124a and 124b, the heat path to the casing is improved.

It may be possible under some conditions to provide an open hub casing so that direct ventilation of the clutch plate is provided but at present it is believed that the added protection against grit and water provided by an enclosed casing is of value. An enclosed casing also provides some protection against condensation on the clutch plates and disc member.

Figure 5:
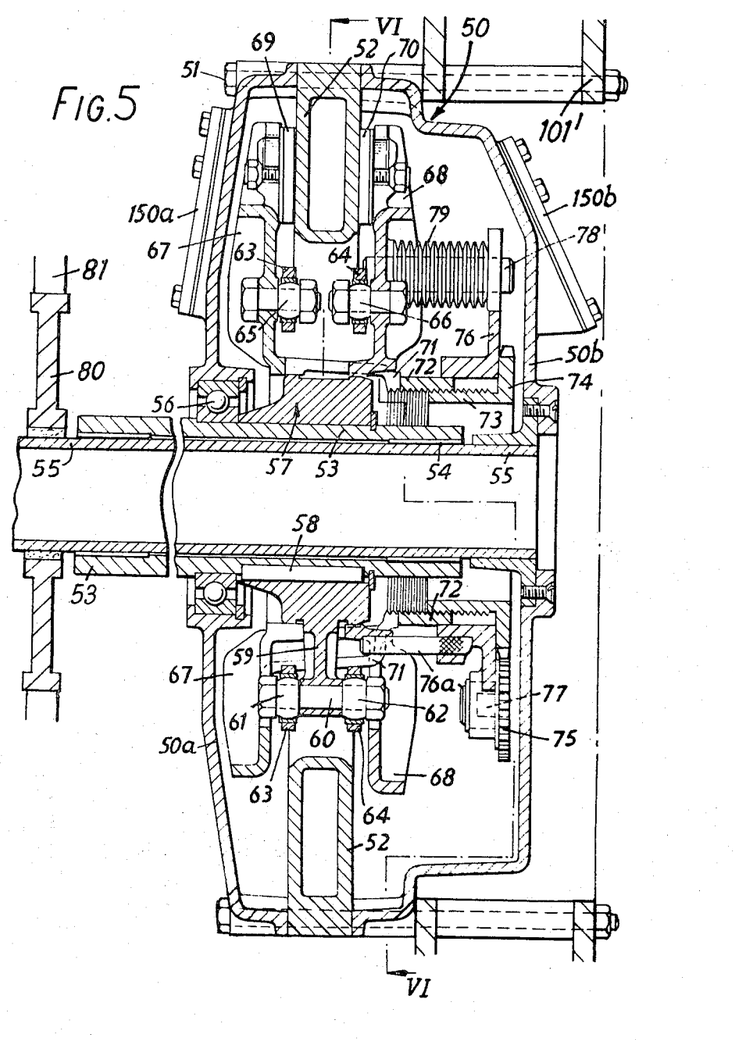
FIG. 5 is a transverse sectional view of the hub of another cable reeling drum.
Figure 6:
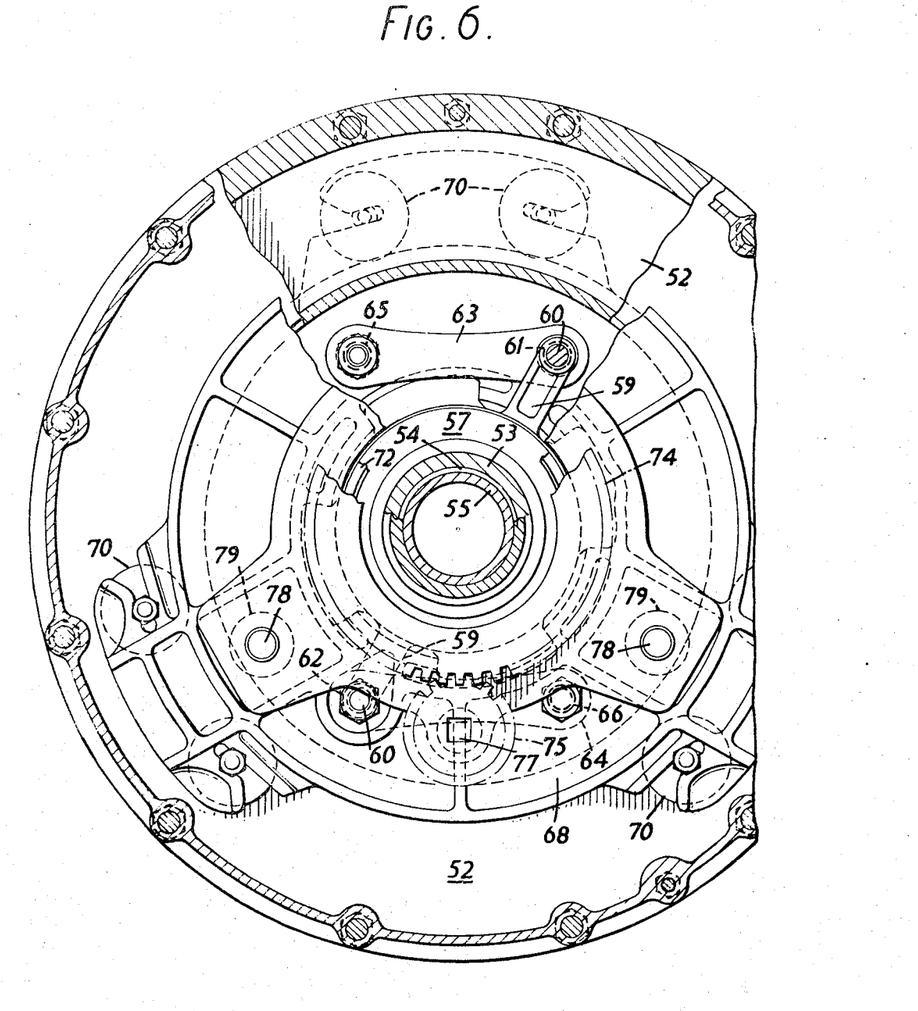
FIG. 6 is a part sectional, part plan view on line VI—VI of FIG. 5.

FIGS. 5 and 6 show a further modified hub arrangement for a cable reeling drum. An enclosed hub casing 50 is assembled in two parts 50a and 50b which are held to-gether by means of through bolts 51 which clamp the parts 50a, 50b onto opposite sides of an annular disc 52 having a channel-shape section over most of its circumference. As before, the casing 50 is rotatably mounted on a hollow drive shaft 53 and supported by bearings 54 on an inner hollow coaxial shaft 55 which is connected to the casing part 50b. The casing part 50a is supported on the shaft 53 by ball bearings 56. Access panels 150a, 150b are provided in each of the two parts of the casing. A cable drum con-nected to the casing is indicated at 101'.

A spider drive member 57 is connected to the drive shaft 53 by means of a key 58. The member 57 has two radial arms 59, each of which carries a transverse bolt 60 on which are mounted the two ball joints 61, 62. Drive links 63, 64 are connected to the ball joints 61, 62, respectively, and are connected at their other ends through further ball joints 65, 66 to first and second clutch plate members 67, 68 respectively. Each clutch member is therefore drivingly connected to the spider member 57 through two links which allow some axial movement of the clutch members. The clutch members 67, 68 are formed with three sets of opposing lobes on which pairs of friction pads 69, 70 are respectively mounted for contact with the disc 52.

The first clutch member 67 is formed with a number of axially extending arms 71 which connect the main body or plate of the member to a sleeve portion 72 on the distant side of casing 50. The portion 72 is internally screwthreaded and engaged with a threaded boss 73 of a major adjusting gear 74. A minor adjusting gear 75 has teeth engaged with those of gear 74 and is rotatably mounted on an annular, axially movable, pressure plate 76, coaxial with the drive and clutch members. The gear 75 has a central key aperture 77 so that it may be rotated by a tool, thereby rotating the major gear and effecting adjustment of the space occupied by the spring assembly 79. Axial movement of the pressure plate 76 is guided by a dowel 76a extending from a sleeve part of the pressure plate 76 adjacent the gear 75. The sleeve part of the pressure plate surrounds the sleeve portion 72 of clutch member 67.

Three pins 78 extend axially from the pressure plate 76 and pass through corresponding apertures in the second clutch member 68; the pressure plate 76 therefore rotates with the drive shaft 53. Each pin 78 is a loose fit in the plate 76 and is located by means of a cir-clip which is arranged in a groove in the pin and held between the first spring washer and the plate 76. Each pin carries a packing of spring washers 79 which urge the first and second clutch members 67 and 68 towards the disc 52. As before, the axial distance between the first clutch member 67 and the pressure plate 76 can be adjusted (by virtue of the screwthreaded engagement) and hence, since both clutch members can adjust their axial positions relative to the disc 52, the pressure exerted by the pads 69, 70 on the disc can be varied. Operation of this modified embodiment is otherwise similar to that of the previous embodiments.

It is to be noted that a continuous section of each annular face of the disc 52 is in contact with the casing 50; as noted earlier this improves the heat path. This embodiment has the further advantage of providing a particularly easy way of adjusting the axial pressure on clutch members.

When used in conjunction with an electrical cable the drum 101' is provided with an aperture so that the stationary end of the cable passes from the drum and through the hollow shaft 55 to a connection on the structure to which the drum is attached. Since the cable tends to rotate as it is reeled it is normally necessary to provide a suitable rotatable connection for the cable at the inner end of shaft 55. As shown in FIG. 5, this may be provided by one or more slip rings 80, in contact with brushes 81. Each slip ring is connected with an appropriate portion of the core of the cable and turns with the shaft 55, from which it is insulated.

A similar arrangement may also be provided with the apparatus of FIG. 1.

Figure 7:
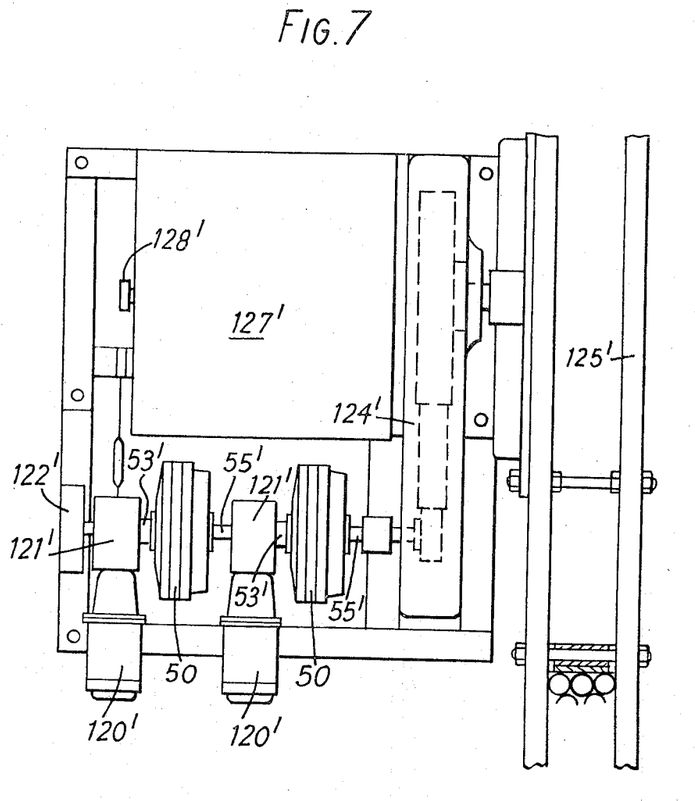
FIG. 7 is a plan view of a drive for a cable reeling drum which utilises two of the drive arrangements according to the present invention.

Although in the embodiments which have been described the casing has been the means of transmitting the drive directly to the cable drum it has already been noted that the inner shafts 5 and 55, which are connected to the respective casings, may be used for this purpose. In FIG. 7 there is shown an arrangement in which two drive units of the type shown in FIG. 5 are used in this way.

The casings 50' are each drivingly connected to a common output shaft 55'. Associated with each casing is a separate input comprising a motor 120' and gearbox 121'. The outputs from the gearboxes 121' are separate and applied to their respective casings through drive shafts 53' coaxial with shaft 55'. The complete shaft assembly is supported in self-aligning bearings 122' (only one shown) and is connected by a self-aligning coupling 123' to the input of a gearbox 124', which drives a cable reeling drum 125'. The complete arrangement is mounted on a frame member 126' which also supports a slip-ring housing 127' in which the necessary rotating electrical interfaces for the cable connections are provided. The cable entry to the housing 127' is indicated at 128'.

By providing two complete drive units (including motor and gearbox) acting on a common shaft it is therefore possible to use standard equipment to supply increased torque requirements in a convenient and economical way.

I claim :

1. A drive arrangement for a cable reeling drum comprising a drive shaft, a support member rotatably mounted on the drive shaft but axially fixed in relation thereto, an annular disc member secured to said support member, a drive member connected to the drive shaft, a first clutch plate member coaxial with the drive shaft and axially floating in relation thereto, at least two links drivingly connecting said first clutch plate member to said drive member, said links being so connected that some axial movement of said first clutch plate member relative to said drive member is allowed, a second clutch plate member coaxial with said drive shaft and axially floating in relation thereto, axially spaced from said first clutch plate member and on the opposite side of said disc member, means connecting said second clutch plate member for rotation with the drive shaft so that axial movement of the second clutch plate member is allowed relative to said first clutch plate member and said disc shaft, and means for applying an axial closing pressure between the first and second clutch plate members so that the clutch plate members press against the opposite sides of the disc member and provide a frictional drive between said drive shaft and said support member, one of said drive shaft and said support member being connected for drive from a motor and the other of said drive shaft and said support member being drivingly connected to a cable reeling drum.

2. A drive arrangement according to claim 1 further including at least two links connecting said second clutch plate member to said drive member, said links constituting said means connecting said second clutch plate member for rotation with the drive shaft.

3. A drive arrangement according to claim 1 wherein said disc member is generally channel-shaped in transverse section, the channel being open outwardly for entry of air for cooling the surfaces engaged by the clutch plate members.

4. A drive arrangement according to claim 1 wherein said support member comprises a casing which encloses said clutch plate members and the surfaces of said disc member engaged by said clutch plate members.

5. A drive arrangement according to claim 4 wherein said casing is formed in at least two parts, said annular disc member being clamped between said parts.

6. A drive arrangement as claimed in claim 1 and further including an annular pressure plate rotatable with said drive shaft and coaxial with said clutch plate members, a pressure member for restraining axial movement of said pressure plate away from said first clutch plate member, and resilient means arranged between the pressure plate and the second clutch plate member, whereby said axial closing pressure is applied to the clutch plates.

7. A drive arrangement as claimed in claim 6 wherein said pressure member and said first clutch plate member are in threaded engagement coaxially with said drive shaft for adjustment of their relative axial positions so that the loading applied by the resilient means to the clutch plate members is adjustable.

8. A drive arrangement as claimed in claim 7 including a first gear member integral with said pressure member, a second gear member rotatably supported by said pressure plate and in engagement with said first gear member for effecting adjustment of said pressure plate in relation to said first clutch member.

9. A drive arrangement as claimed in claim 6 wherein the means for applying axial closing pressure on said first and second clutch plate members comprises a plurality of pins extending between said pressure plate and said second clutch plate member and a stack of axially compressible spring discs mounted on such pins.

* * * * *